United States Patent

[11] 3,631,494

[72] Inventors Michael J. Gans
Middletown Township;
Douglas O. J. Reudink, Colts Neck, both of N.J.
[21] Appl. No. 848,582
[22] Filed Aug. 8, 1969
[45] Patented Dec. 28, 1971
[73] Assignee Bell Telephone Laboratories, Incorporated
Murray Hill, Berkeley Heights, N.J.

[54] RETRANSMISSION SYSTEM
12 Claims, 4 Drawing Figs.

[52] U.S. Cl. .......... 343/100TD, 343/100 CS, 343/854
[51] Int. Cl. .......... H04b 7/00
[50] Field of Search .......... H01q/3/26; 343/100 CS, 100 TD

[56] References Cited

UNITED STATES PATENTS 3,175,216 3/1965 Enloe .......... 343/100 TD

*Primary Examiner*—T. H. Tubbesing
*Attorneys*—R. J. Guenther and E. W. Adams, Jr.

ABSTRACT: In a space diversity phased array radio station capable of retransmission, each branch receives a pilot signal containing phase information which is used to continuously control the phase of the retransmitted signal containing return intelligence, thus providing adaptive retransmission from the array. To prevent a strong retransmission signal from swamping a weak pilot when their frequency separation is small, a sample of the retransmission is applied to the receiving section to act as the local oscillator for down-conversion of the pilot, thereby avoiding unwanted mixer products in the retransmission loop and minimizing crosstalk between the reception and retransmission.

3 Sheets-Sheet 1

INVENTORS M. J. GANS
D. O. J. REUDINK
BY Roy M. Porter Jr.
ATTORNEY

RETRANSMISSION SYSTEM

BACKGROUND OF THE INVENTION

This invention relates to communication systems, and more particularly to space diversity phased array retransmission systems for use in a highly dispersive medium. Specifically, the invention utilizes the retransmission signal as a local oscillator for down-conversion of the incoming phase reference signal to provide adaptive retransmission on a continuous basis where the frequency separation of the reference and retransmission signals is very small as mandated by the dispersive medium.

In retransmission systems a space diversity phased array is employed to improve transmission quality, especially by reducing the effects of fading which may be due in part to multipaths experienced by the transmission between stations. Each element of the array receives from an originating station an intelligence signal and a pilot signal which may be either a part of, or independent of, the intelligence, and commonly, predetection combining is employed to overcome multipath phase distortion of the received intelligence.

The return intelligence is transmitted by each element of the array under control of the pilot which contains phase information corresponding to the phase angle of the reception of that element. The phase information is used to control the phase of the transmission hereinafter referred to as retransmission from that element. Most conventionally, the complex conjugate phase of the pilot received by each element is applied to a generated signal and the combined outputs of the elements of the array produce a total retransmission such that the signal received by the originating station or some other prescribed location will be optimum. In a multipath environment, the array may, of course, radiate the retransmitted signals in directions other than toward the designated reception location.

In order to provide useful directivity, the phase information of the received pilot must be appropriate to the retransmission and hence the frequencies of the two must be within a phase coherent bandwidth. In satellite systems using retransmission, such as is disclosed in U.S. Pat. No. 3,273,151 issued to C. C. Cutler et al., Sept. 13, 1966, the incoming pilot and retransmitted intelligence carrier are widely separated in frequency but the transmission medium is such that the phase coherent bandwidth is broad enough to accommodate the separation. In other environments, such as mobile radios operating in urban areas at microwave frequencies, the transmission experiences a highly dispersive medium and hence, a very narrow phase coherent bandwidth. Such an environment requires that the frequencies of the incoming signal containing the phase information and the retransmitted intelligence be within this narrow band, the width of which is only about 100 kHz. for frequencies on the order of 10 gHz. Continuous detection of the pilot in the presence of retransmission at a nearly identical frequency presents a severe isolation problem. This difficulty is magnified immensely when, as in a mobile radio application, the incoming pilot is very weak relative to the retransmission, and the phase information is apt to be irretrievably lost as a result of the pilot's being swamped by the leakage of the retransmission.

SUMMARY OF THE INVENTION

It is an object of this invention to provide adaptive retransmission on a continuous basis in a highly dispersive medium.

It is a further object to provide a retransmitting station capable of operating on a continuous basis in an environment of a weak incoming pilot signal and a strong retransmission signal of nearly identical frequencies.

In accordance with the invention, the retransmission loop in each branch of a phased array retransmitting station is designed to pass a sample of the retransmitted signal into the receiving section where it acts as a local oscillator for down-conversion of the pilot which contains the phase information and possibly the incoming intelligence. Thus, rather than requiring it to be discriminated against, the retransmitted signal is intentionally used in the receiving section and the retransmission loop is arranged to utilize the product of the pilot and the retransmission. The presence of the retransmission does not give rise to swamping as in the prior art, but on the contrary, produces a desired signal, which is combined with the generated return signal by a retransmission mixer to control the phase of retransmission. This signal, however, contains the unnecessary conjugate phase information which was on the retransmitted signal in addition to the incoming phase information needed for control. The phase feedback which would result from a direct mixing of the generated signal and such a control signal is avoided by one of two alternative mechanisms. The first utilizes a frequency divider which halves the signals in the loop and the resultant half-angles serve to nullify phase feedback. The second utilizes double mixing by a common local oscillator to eliminate the effects of phase feedback in the loop. In order to enable filtering of an unwanted sideband from the retransmission mixer, a frequency offset is also required. In the double mixing technique, the offset is provided by selection of the center frequency of the generated return signal whereas in the frequency divider technique the offset is provided by a separate offset oscillator.

DETAILED DESCRIPTION

Figure 2:
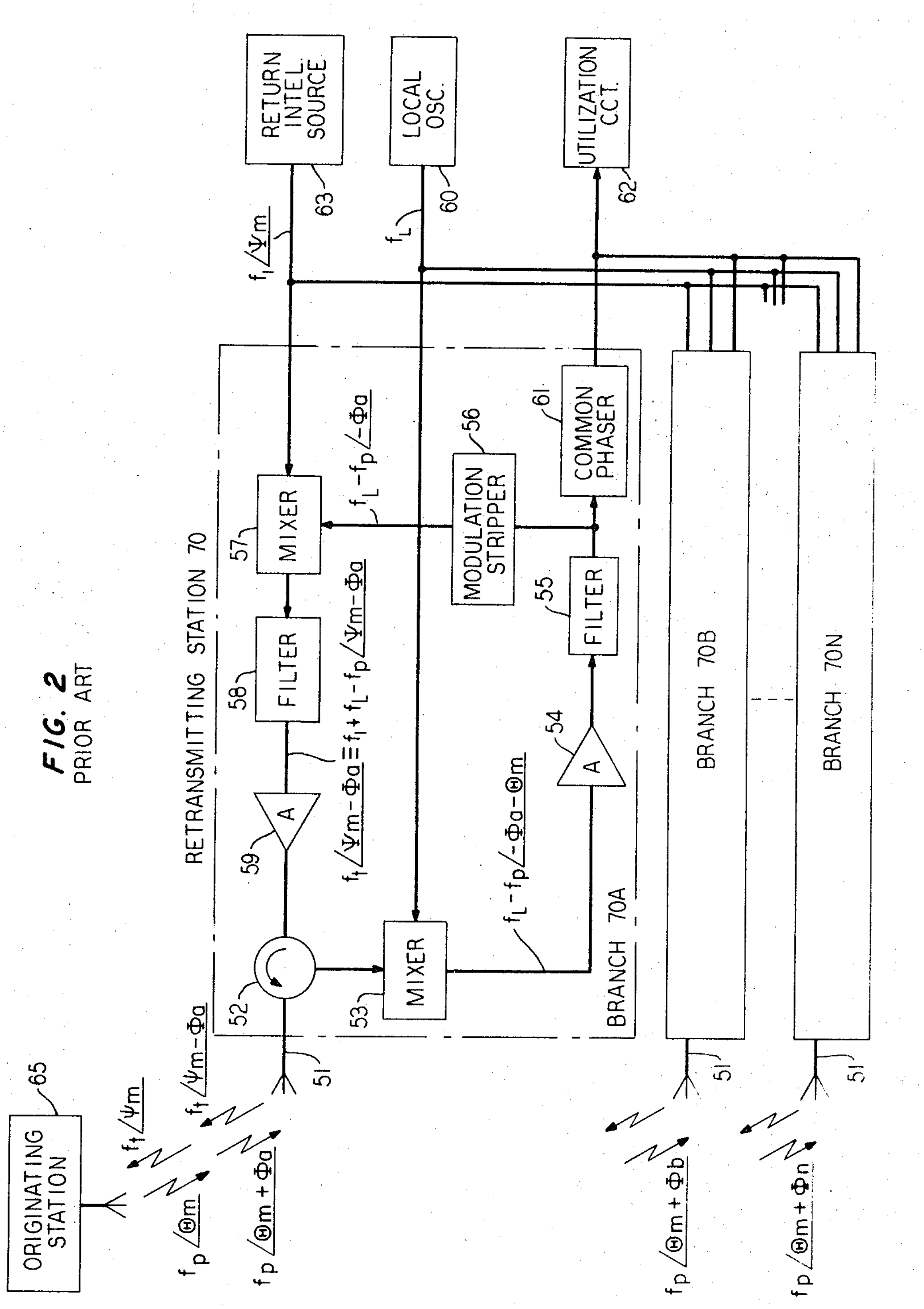
FIG. 2 PRIOR ART
FIG. 2 is a block diagram illustrative of a separated frequency retransmission system representative of the prior art.

The retransmission system disclosed in FIG. 2 is an example of a conventional system employing widely separated pilot and retransmission carrier frequencies, $f_p$ and $f_t$, respectively. For simplicity, the intelligence modulation from originating station 65 is indicated as phase angle $\theta_m$ on pilot frequency $f_p$ which is radiated by station 65, but the intelligence may, of course, also be transmitted independently of the pilot tone. An individual antenna 51 in each branch 70A through 70N of retransmitting station 70 receives the pilot $f_p$. Phase shift in the transmission medium gives rise to an additional phase angle and the space diversity of antennas 51 results in the reception of a distinct phase angle $\phi$ in each branch designated, for example, $\phi_a$ in branch 70A. With reference to branch 70A which is identical to all other branches, the reception is fed through an isolating duplexer represented by circulator 52 to mixer 53 where it is mixed with a signal of frequency $f_L$ from common local oscillator 60. Assuming $f_L$ is greater than $f_p$ and ignoring the constant phase angle of the signal from oscillator 60, the resultant difference signal has a translated frequency $f_L - f_p$ and a phase angle $-\phi_a - \theta_m$ which is designated $f_L - f_p \lfloor -\phi_a - \theta_m$. This signal is amplified by amplifier 54 and filtered by filter 55 to eliminate the sum product of mixer 53. Common phaser 61 which may be any conventional phasing circuit, such as in the receiver disclosed in U.S. Pat. No. 2,683,213 issued July 6, 1954 to C. W. Earp, splits the signal from filter 55 into two portions and recombines the portions to eliminate the phase $\phi_a$ while retaining $\theta_m$. This reduces the reception in each branch to a common phase and permits predetection combining. Utilization circuit 62 detects the intelligence modulation $\theta_m$.

The translated signal from filter 55 is also passed to retransmission mixer 57 after the modulation $\theta_m$ is removed by modulation stripper 56, which may be a narrowband filter for the case of broadband modulation. Return intelligence generated by source 63 and designated $f_1 \angle \Psi_m$ is modulated on the translated pilot $f_L-f_p \angle -\phi_a$ by mixer 57 and the sum product forms the retransmission signal $f_1+f_L-f_p \angle \Psi_m-\phi_a$ which is defined as $f_t \angle \Psi_m-\phi_a$. Filter 58 blocks the lower sideband of mixer 57 and amplifier 59 produces a strong retransmission signal which is applied through circulator 52 to antenna 51. Each identical branch 70A through 70N thus radiates a retransmission signal having the opposite phase angle −100 to that of the received pilot in that branch of the array. This adjustment of phase in each branch provides adaptive directivity of the retransmission as is well known in the art.

If the frequencies of reception $f_p$ and retransmission $f_t$ are sufficiently separated so that the needed isolation is provided, the system will operate properly, but where a narrow phase coherent bandwidth requires the use of signals very close in frequency, isolation is practically impossible, primarily because of reflections in the antenna and because known duplexers cannot separate sufficiently the pilot and retransmission signals. The strong retransmission appears in the common portion (antenna and duplexer) of the retransmitting station and leaks into the reception path swamping the pilot signal. In fact, the retransmission leakage of $f_t$ is translated to IF by mixer 53 producing a signal of frequency $f_L-f_t$ which mixes with the generated signal $f_1$ in mixer 57 to produce an additional and undesired upper sideband of frequency $f_1+f_L-f_t$ in addition to the desired frequency $f_t$, and since $f_t$ was defined as $f_1+f_L-f_p$, the undesired sideband reduces to $f_p$. Because the leakage is strong this undesired product is a strong signal at the identical frequency of the incoming pilot and, of course, destroys the capability of detecting the weak incoming pilot.

Figure 1:
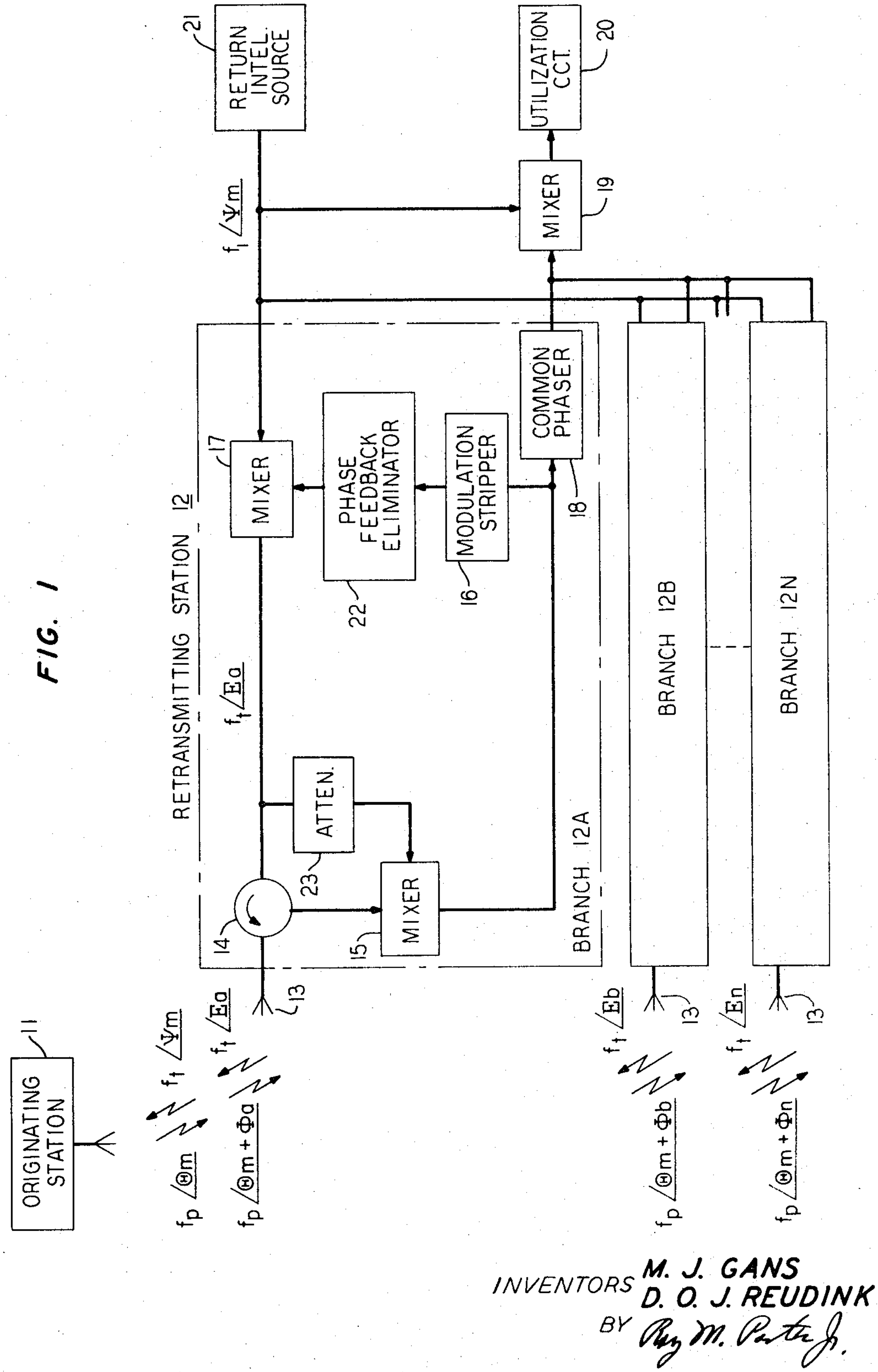
FIG. 1 is a functional block diagram of a retransmission system in which the retransmitted signal is used as a local oscillator at the retransmitting station in accordance with the invention.

A retransmission system illustrating the operation of the invention is shown in FIG. 1, but since the block diagram is not a working circuit, conventional components such as filters and amplifiers have been omitted for simplicity. The problem of leakage of the retransmission signal is avoided by intentionally utilizing a sample of the retransmitted signal as the local oscillator for the frequency conversion of the reception. This eliminates unwanted and unfilterable mixer products which swamp the received phase reference signal.

In transit from originating station 11 to retransmitting station 12 a phase shift occurs causing the reception at each of the physically separated elements 13 of the antenna array of station 12 to contain a distinct additive phase which is designated $\phi_a$ through $\phi_n$ for the branches 12A through 12N, respectively. As in the description of the prior art embodiment, originating station 11 radiates a carrier which is referred to as a pilot or phase reference signal, and modulation representative of the intelligence from originating station 11 is assumed to be carried by the pilot. Other schemes for transmitting the phase reference and intelligence signals are, of course, possible. For example, a *cw* signal separated in frequency from the intelligence modulated signal may be used as a pilot, or the modulated signal itself may be delayed and used as a pilot. In another scheme, the pilot and signal are derived as the two products of a balanced modulator.

For purposes of discussion, it has been assumed that originating station 11 is a fixed or base station which has a single antenna and hence no adaptive retransmitting capability, and retransmitting station 12 is a mobile station. It is, of course, possible that both stations may be mobile and also possible for originating station 11 to have a phased array and retransmission capabilities thereby providing adaptive retransmission in both directions.

The principal feature of this retransmission scheme is to apply a sample of the retransmitted signal to the receiving section of the retransmitting station and utilize it as a local oscillator in detecting a weak pilot signal. This use of the retransmitted signal assumes of course that the sampled retransmitted signal is appropriately limited in power, so as not to overdrive the receiver.

The radiation from originating station 11 arriving at antenna 13 of branch 12A of retransmitting station 12 is $f_p \angle \theta_m+\phi_a$ and retransmission from branch 12A is assumed to be $f_t \angle E_a$. The frequencies $f_p$ and $f_t$ must, of course, be sufficiently close to be within the phase coherent bandwidth. Phase angle $E_a$ includes the return intelligence modulation $\Psi_m$, the negative of the incoming phase $\phi_a$ and any phase constants derived from the retransmission loop. As each of the branches of station 12 operates identically with all the others, reference will be made only to an exemplary branch 12A. The incoming signal passes through duplexer 14, which may be, for example, a T-R switch, directional coupler or circulator, and is combined with a sample of the retransmitted signal by mixer 15.

The path of the retransmission input to mixer 15 is indicated as passing through attenuator 23 which is used to control the power level of the sample. This path may represent leakage through circulator 14 which can actually provide only imperfect isolation, but the proper power level of the leakage must, of course, be maintained. Typically, for example, a single branch of the retransmission system for a mobile radio might retransmit one watt and in order to limit the power of the retransmitted sample to 10 milliwatts the isolation of the antenna duplexer such as a directional coupler or circulator 14 must be better than 20 db. and the VSWR at the input to the antenna should be lower than 1.2.

Assuming the retransmission frequency $f_t$ is greater than the pilot $f_p$ the difference product of mixer 15 will have a phase angle $E_a-\phi_a$, as well as the incoming intelligence modulation $\theta_m$. If detection of incoming intelligence is desired and if the pilot $f_p$ contains the intelligence modulation, a portion of the difference signal from mixer 15 is passed to a conventional common phaser 18, which removes the distinct phase $-2\phi_a$ which results from the difference product of the phase $\phi_a$ of the pilot and $-\phi_a$ derived from the phase $E_a$ of the retransmitted signal. The above-mentioned Earp patent discloses a suitable circuit which mixes the signal with itself to produce an output which contains only the incoming intelligence modulation $\theta_m$ and the return intelligence modulation $\Psi_m$. The common phased signals from each branch are combined and fed to mixer 19 where the combined signal is mixed with the signal from return intelligence source 21. The difference product which does not contain the return intelligence modulation $\Psi_m$ is applied to utilization circuit 20 in which the incoming modulation $\theta_m$ is detected.

The output of mixer 15 is an intermediary control signal containing the phase information $\phi$ corresponding to the reception of the element associated with that branch. Where one portion of this intermediary signal is passed to a utilization circuit for detection of the incoming modulation $\theta_m$, the other portion is processed by modulation stripper 16 to eliminate $\theta_m$. Stripper 16 may be a filter or delay circuit or other device appropriate to the pilot scheme of the system. Alternatively, $\theta_m$ could be left on the signal to be removed when received by originating station 11.

Return intelligence source 21 generates a signal $f_1 \angle \Psi_m$ which, if mixed directly with the intermediary signal by retransmission mixer 17, would result in an upper sideband product containing both the incoming phase $\phi_a$ and the retransmitted phase $E_a$. This, of course, would give rise to phase feedback in the loop since this combination does not produce the assumed retransmission phase $E_a$. This feedback is indicated as being removed by phase feedback eliminator 22 which is representative of circuitry in the loop which may be essentially a frequency divider or a mixing circuit as will be described below. The output of eliminator 22 represents the control signal which establishes the phase of the retransmitted signal. An unwanted lower sideband of mixer 17 is quite close to the desired retransmission frequency and is substantially the same as the input frequency and thus cannot be completely eliminated by filtering. This additional difficulty is also eliminated by specific features illustrated in FIGS. 3 and 4 and described below in more detail.

After elimination of the phase feedback and the reduction of undesired products, the phase $E_a$ of the retransmitted signal contains only the return intelligence modulation and the conjugate phase to that of the reception in its branch. The output phase is thus controlled by the input phase, subject, of course, to the time constants in the loop. Station 12 is therefore referred to as an adaptive phased array retransmitting station, and the combined retransmissions from antennas 13 are received at originating station 11 as a single signal having essentially only the modulation from source 21. As the retransmitted signal is used in the reception section of station 12, no problem of swamping exists.

Figure 3:
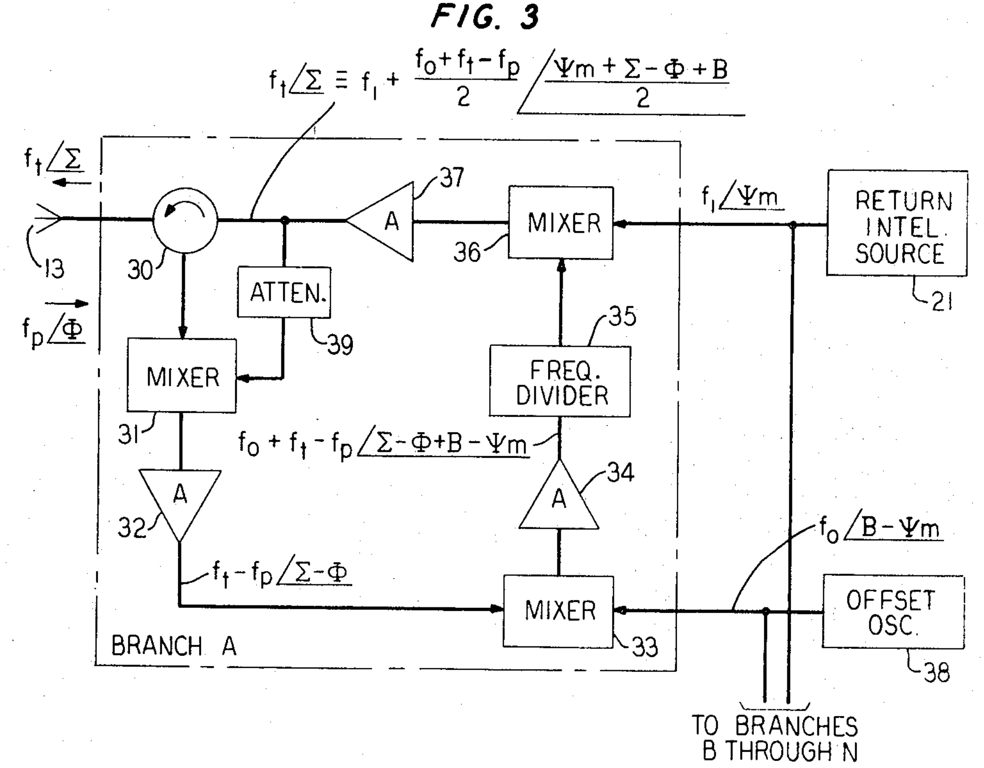
FIG. 3 is a block diagram of one branch of the retransmitting station of FIG. 1 illustrating one implementation of the invention using a frequency divider.

FIG. 3 illustrates an implementation of a branch such as 12A of retransmitting station 12 which utilizes frequency divider 35 to perform the function of feedback eliminator 22 and offset oscillator 38 to help eliminate the unwanted sideband. For simplicity, the subscripts for the phase angles indicative of a specific branch have been dropped, filters have been omitted, and the reception of intelligence modulation is ignored in this description of the retransmission loop. The received input is therefore assumed to be merely $f_p \angle \phi$ but the output of preamplifier 32 could be applied to a conventional predetection combining receiver provided the return intelligence modulation is eliminated as indicated in FIG. 1. In this case it may be desirable to strip off the incoming intelligence modulation $\theta_m$ prior to passing the signal from preamplifier 32 to the retransmission section of the loop.

A sample of the retransmitted signal, assumed to be $f_t \angle \Sigma$ is beat with the incoming pilot $f_p \angle \phi$ by mixer 31. The sample passes through attenuator 39 which controls the power level. The sample may, of course, leak through duplexer 30 as described above. The difference mixer product $f_t - f_p \angle \Sigma - \phi$ is amplified by preamplifier 32 and mixed at mixer 33 with an offset signal $f_o \angle \beta - \Psi_m$ from offset oscillator 38 which is common to all branches. The output of mixer 33 is $f_o + f_t - f_p \angle \Sigma - \phi + \beta - \Psi_m$, where $\Psi_m$ is the modulation produced by return intelligence source 21 and $\beta$ is a constant phase of offset oscillator 38 which is inserted for the purposes of completeness, but since it is constant and common to all branches, it has no effect on the operation of the circuit. It is noted that if the incoming signal contains intelligence modulation, the output product of mixer 33 may be used for reception as this signal is inherently free of the return intelligence modulation; and hence, an additive mixer such as 19 in FIG. 1 is unnecessary.

The output of mixer 33 is filtered and passed through limiting amplifier 34 and then into frequency divider 35 having a ratio one-half which produces a resultant signal $$\frac{f_0+f_t-f_p}{2} \angle \frac{\Sigma-\Phi+\beta-\Psi_m}{2}$$

This is the control and it is mixed with the return intelligence signal $f_1 \angle \Psi_m$ from source 21 by retransmission mixer 36. The upper mixer product is $$f_1+\frac{f_0+f_t-f_p}{2} \angle \frac{\Psi_m+\Sigma-\Phi+\beta}{2}$$

The output of mixer 36 is the retransmitted signal and equating it with $f_t \angle \Sigma$ which was assumed above, results in $f_t$ equaling $2f_1+f_o-f_p$ and $\Sigma$ equaling $\Psi_m+\beta-\phi$. In designing the system, therefore, $f_1$ and $f_o$ must be closed so that $f_t$ is within the phase coherent bandwidth of $f_p$. By examination of $\Sigma$ it is seen that the retransmitted signal contains the negative phase $-\phi$ of the incoming signal and hence the modulation index of the FM signal transmitted from the associated antenna element 13 will equal that of source 21 at frequency $f_1$.

Limiting amplifier 34 is required to facilitate frequency division which is essential to eliminating phase feedback. Frequency divider 35 is a conventional frequency divider of a ratio one-half which is necessary to provide the correct resultant phase for retransmission.

Frequency translation by offset oscillator 38 is required so that the undesired lower sideband from mixer 36 will be offset from the incoming pilot frequency. This must be avoided so that sufficient suppression of the pilot signal is possible over the whole bandwidth to prevent self-oscillation of the loop.

The scheme illustrated in FIG. 3 is essentially a feedback scheme in that it uses a phase angle which is dependent in part on the phase of the retransmission to control the retransmission itself. Thus, there will be a time delay before the system reaches equilibrium and it is desirable that this time delay be minimized because the pilot phase becomes uncorrelated in a short time if there is any motion of one station relative to the other as is to be expected where the station is part of a mobile system.

Figure 4:
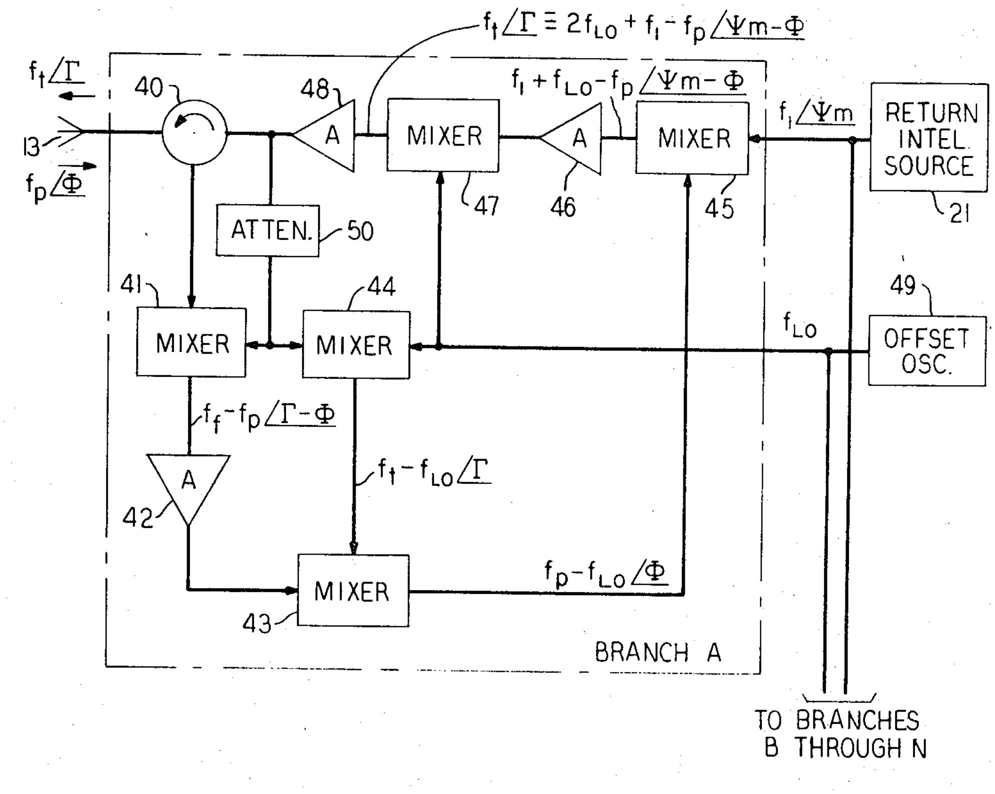
FIG. 4 is a block diagram of one branch of the retransmitting station FIG. 1 illustrating another implementation of the invention using double mixing.

FIG. 4 illustrates an alternative implementation of a branch of a retransmission station such as station 12 which utilizes multiple mixing in order to eliminate phase feedback. For simplicity filters have been omitted.

The incoming signal $f_p \angle \phi$ again ignores any incoming intelligence modulation. This received pilot passes through duplexer 40 to mixer 41 where it is mixed with a sample of retransmission signal $f_t \angle \Gamma$ which is power limited by attenuator 50. Assuming $f_t$ is greater than $f_p$ the difference product of mixer 41 is $f_t - f_p \angle \Gamma - \phi$ which is amplified by preamplifier 42 and passed to mixer 43 as an intermediary control signal. The retransmitted signal sample is also applied to mixer 44 where it is mixed with a signal $f_{LO}$ from local oscillator 49 which is common to all branches. The phase of the output of local oscillator 49 is assumed to be zero and is hence ignored. Local oscillator 49 is designed so that $f_{LO}$ is less than $f_t$ and the difference product of mixer 44 is $f_t - f_{LO} \angle \Gamma$. This signal is applied to mixer 43 along with the output from mixer 41 to produce a signal $f_p - f_{LO} \angle \phi$ and since phase $\Gamma$ has been eliminated by this double mixing technique the output of mixer 43 is an appropriate control signal containing the phase of the incoming pilot. It is noted that as in the frequency divider case above, the output of mixer 43 is free of the retransmitted modulation and if detection of incoming modulation is desired, this signal may be fed to the utilization circuit without an additional mixer such as 19 in FIG. 1.

The output of mixer 43 is applied to retransmission mixer 45 with the return intelligence signal $f_1 \angle \Psi_m$ generated by return intelligence source 21. The resultant difference output $f_1+f_{LO}-f_p \angle \Psi_m - \phi$ is passed through limiting amplifier 46 and then to mixer 57 where it is combined with the signal $f_{LO}$ from local oscillator 49. The sum output of mixer 47 is $2f_{LO}+f_1-f_p \angle \Psi_m - \phi$. This is the retransmitted signal which was previously assumed to be $f_t \angle \Gamma$. Equating these two expressions, $f_t$ equals $2f_{LO}+f_1-f_p$ and $\Gamma$ equals $\Psi_m - \phi$. Frequencies $f_{LO}$ and $f_1$, must therefore be chosen appropriately so that $f_t$ and $f_p$ are within a phase coherent bandwidth and by reference to the value of $\Gamma$ it is seen that the retransmitted signal contains the return intelligence modulation $\Psi_m$ and the negative phase to that of the incoming pilot. This scheme is not a feedback system and therefore regardless of the initial phase of $f_t$ its phase is automatically corrected as soon as the pilot $f_p$ is received.

In both the frequency divider and double mixing implementations illustrated in FIGS. 3 and 4 respectively filtering must be provided as required by the frequencies, harmonics and sidebands of the system. Filters have been omitted in the discussion above, but it has been assumed that, where needed, the mixer, amplifier, preamplifier or a filter not shown provides the appropriate filtering function in a conventional manner.

Although FM (and equivalently PM) has been used as an example of the modulation in the above description only minor modifications obvious to one skilled in the art are required in the retransmission circuitry of either the frequency divider or double mixing implementation to convert to other modulation techniques. Likewise each of the above-mentioned pilot schemes is suitable for use with either of the implementations.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

We claim:

1. A radio communication system for transmitting between an originating station and retransmitting station comprising means for transmitting from said originating station a phase reference signal, an antenna array of elements located at said retransmitting station, each of said elements receiving said phase reference signal having a phase angle distinctive to that element and each element having associated therewith a retransmission branch including:

means for combining a sample of a retransmitted signal with said received phase reference signal to produce a control signal, means for utilizing said control signal to operate on a generated return signal to produce said retransmitted signal having a phase angle opposite that of said distinctive angle of said each element, and means for radiating from said each element said retransmitted signal.

2. A system as claimed in claim 1 wherein means are provided for generating said return signal so as to produce said generated signal having a frequency such that the frequency of said retransmitted signal is within the phase coherent bandwidth of said phase reference signal.

3. A system as claimed in claim 2 wherein said means for combining said sample of retransmitted signal and said received phase reference signal includes a path for passing leakage of said retransmitted signal to a mixer where said leakage is mixed with said received phase reference signal.

4. A system as claimed in claim 2 wherein at least one of said stations is a mobile station.

5. A system as claimed in claim 2 wherein means are provided for modulating an intelligence signal on said generated signal.

6. A system as claimed in claim 2 wherein means are provided for transmitting intelligence modulation from said originating station in association with said phase reference signal and said retransmitting station includes means for receiving said intelligence modulation in each of said branches, means for reducing to a common phase the reception in each of said branches and means for combining and detecting said received modulation exclusive of all other modulation.

7. A system as claimed in claim 2 wherein said combining means for producing a control signal in each of said retransmission branches includes means for mixing said phase reference signal and said sample of said retransmitted signal to produce an intermediary signal and means for eliminating from said intermediary signal the effect of said opposite phase angle present on said retransmitted signal.

8. A system as claimed in claim 2 wherein said combining means for producing a control signal in each of said retransmitting branches includes means for mixing said phase reference signal and said sample of said retransmitted signal to produce an intermediary signal and means for dividing by two the frequency and phase of said intermediary signal to produce said control signal, whereby said control signal has eliminated therefrom the effect of said opposite phase angle present on said retransmitted signal.

9. A system as claimed in claim 8 further comprising in each of said retransmission branches means for mixing with said intermediary signal an offset oscillator signal of constant frequency and constant phase common to all of said branches.

10. A system as claimed in claim 2 wherein said combining means for producing a control signal in each of said retransmission branches includes means for mixing said phase reference signal and said sample of said retransmitted signal to produce an intermediary signal, means for mixing said sample of said retransmitted signal with an oscillator signal of constant frequency and constant phase common to all of said branches to produce a difference output, means for mixing said intermediary signal with said difference output to produce said control signal having a phase angle proportional to said distinctive phase angle of said phase reference signal received by said each element and unaffected by the phase of said retransmitted signal, and wherein said means for utilizing said control signal to operate on said generated signal further includes means for mixing said generated signal and said control signal to produce a resultant signal and means for mixing said resultant signal with said oscillator signal to produce said retransmitted signal.

11. A system as claimed in claim 10 wherein the center frequency of said generated return signal is selected such that a frequency offset of said resultant signal is produced.

12. A radio retransmitting station comprising a transmitter and a plurality of branches each of said branches comprising antenna means for receiving a pilot signal and for radiating a transmitted signal, means for operating on said received pilot signal to produce a control signal having a phase angle proportional to the phase of said pilot signal said operating means including means for beating said pilot and a sample of said transmitted signal, and means for combining said control signal with the signal from said transmitter to produce said transmitted signal having a conjugate phase to that of said pilot signal received by said antenna.

* * * * *